US007069294B2

(12) United States Patent
Clough et al.

(10) Patent No.: US 7,069,294 B2
(45) Date of Patent: Jun. 27, 2006

(54) BROWSER BASED MULTIPLE FILE UPLOAD

(75) Inventors: James Clough, Meridian, ID (US); Darrel Cherry, Meridian, ID (US); Brennen Stollfus, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 09/990,837

(22) Filed: Nov. 14, 2001

(65) Prior Publication Data

US 2003/0093464 A1    May 15, 2003

(51) Int. Cl.
G06F 15/16 (2006.01)
G06F 9/44 (2006.01)
G06F 9/445 (2006.01)
G06F 15/177 (2006.01)

(52) U.S. Cl. ............... 709/203; 717/171; 717/175; 717/178; 717/174; 709/221; 709/222

(58) Field of Classification Search ............ 709/220, 709/217, 219, 221, 222, 203; 717/148, 171, 717/172, 173, 174, 175, 176, 177, 178; 707/3, 707/5; 358/1.1; 713/170
See application file for complete search history.

(56) References Cited

U.S. PATENT DOCUMENTS

| | | | |
|---|---|---|---|
| 5,748,980 A * | 5/1998 | Lipe et al. ..................... 710/8 |
| 5,761,499 A * | 6/1998 | Sonderegger ................. 707/10 |
| 5,781,909 A * | 7/1998 | Logan et al. ................ 707/200 |
| 5,805,442 A * | 9/1998 | Crater et al. ................... 700/9 |
| 5,901,286 A * | 5/1999 | Danknick et al. ........... 709/203 |
| 5,923,885 A * | 7/1999 | Johnson et al. ............. 717/176 |
| 6,052,720 A * | 4/2000 | Traversat et al. ........... 709/220 |
| 6,085,229 A * | 7/2000 | Newman et al. ............ 709/203 |
| 6,092,078 A * | 7/2000 | Adolfsson ................... 707/102 |
| 6,125,372 A * | 9/2000 | White ......................... 707/205 |
| 6,161,125 A * | 12/2000 | Traversat et al. ........... 709/203 |
| 6,269,481 B1 * | 7/2001 | Perlman et al. ............. 717/178 |
| 6,347,398 B1 * | 2/2002 | Parthasarathy et al. ..... 717/178 |
| 6,353,848 B1 * | 3/2002 | Morris ....................... 709/203 |
| 6,456,388 B1 * | 9/2002 | Inoue et al. ................ 358/1.15 |
| 6,717,686 B1 * | 4/2004 | Farros et al. ................ 358/1.1 |
| 6,732,162 B1 * | 5/2004 | Wood et al. ................ 709/219 |
| 6,910,128 B1 * | 6/2005 | Skibbie et al. .............. 713/170 |
| 2001/0055492 A1 * | 12/2001 | Wood et al. .................... 399/8 |
| 2002/0095351 A1 * | 7/2002 | Hitaka .......................... 705/26 |
| 2002/0100038 A1 * | 7/2002 | Balassanian ................ 717/177 |
| 2002/0198969 A1 * | 12/2002 | Engel et al. ................ 709/220 |
| 2004/0015958 A1 * | 1/2004 | Veil et al. ................... 717/174 |

OTHER PUBLICATIONS

Brandt, Andrew. "Serve Up Webcam Images Without a PC." PC WORLD. Jun. 29, 2000. Dec. 22, 2004 <http://www.pcworld.com/reviews/article/0,aid,17496,00.asp>.*
Technical Overview—AXIS 2100. Dec. 22, 2004 <http://www.axis.com/products/cam_2100/2100to.htm>.*
Brother. Mass Deploying Windows Drivers in Windows 2000. Whitepaper, 2001.*

* cited by examiner

*Primary Examiner*—Krisna Lim
*Assistant Examiner*—Philip Chea (57) ABSTRACT

A method and/or a system for loading files on a server. An exemplary method communicates an information-containing file from a client to a server, generates an applet based on the information contained in the file, communicates the applet from the server to the client, executes the applet on the client to thereby cause a search for an additional file and communicates the additional file to the server.

24 Claims, 10 Drawing Sheets

BROWSER BASED MULTIPLE FILE UPLOAD

TECHNICAL FIELD

The present invention relates to loading files. More particularly, the invention relates to a method and/or systems for loading files from a client to a server.

SUMMARY

A method for loading a file on a workstation and/or a server comprising communicating information from a device having a virtual machine (e.g., workstation, server, or other device) to the workstation; generating an applet based on the information; communicating the applet from the workstation to the device; executing the applet on the device to thereby cause searching for a file; and communicating the file to the workstation. Also disclosed is a computer-readable medium containing a computer program that is storable in memory and executable by a processor to facilitate file loading.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
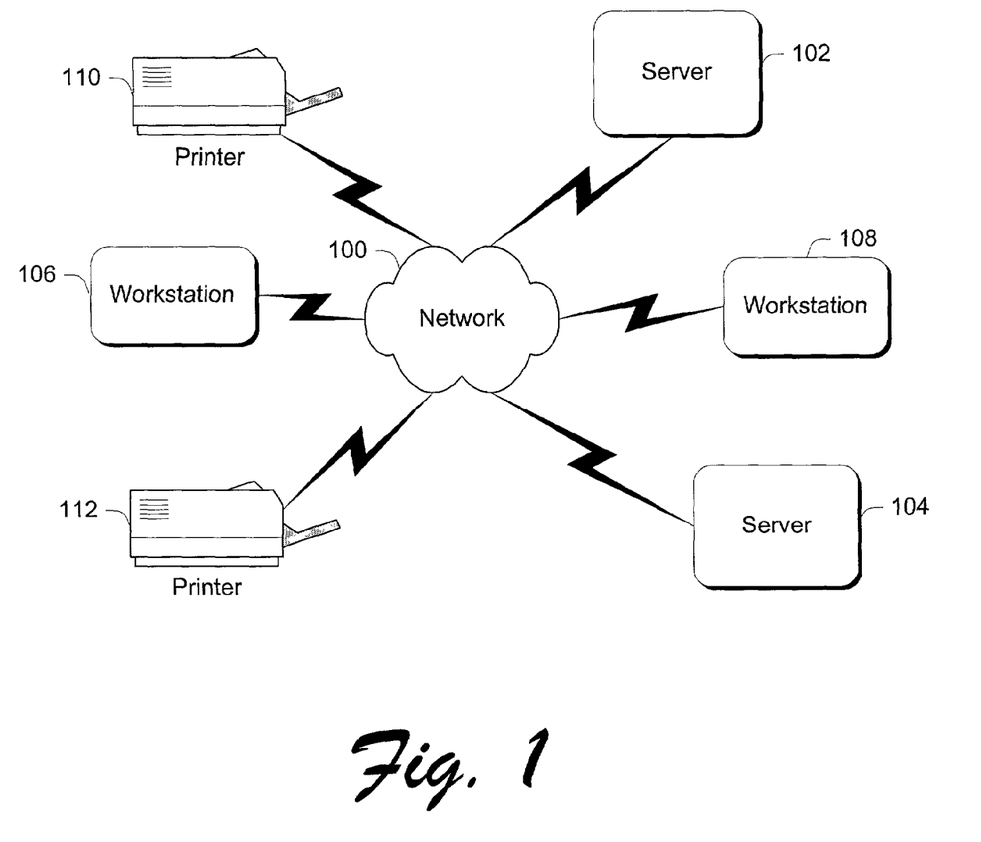
FIG. 1 illustrates a network environment in which multiple servers, workstations, and printers are coupled to one another via a data communication network.

FIG. 1 illustrates a network environment in which multiple servers, workstations, and printers are coupled to one another via a data communication network 100. The network 100 couples together servers 102 and 104, computer workstations 106 and 108, and printers 110 and 112. Network 100 can be any type of network, such as a local area network (LAN) or a wide area network (WAN), using any type of network topology and any network communication protocol. In a particular embodiment, network 100 is the Internet. Although only a few devices are shown coupled to network 100, a typical network may include tens or hundreds of devices coupled to one another. Furthermore, network 100 may be coupled to one or more other networks, thereby providing coupling between a greater number of devices.

Servers 102 and 104 may be file servers, email servers, database servers, print servers, or any other type of network server. Workstations 106 and 108 can be any type of computing device, such as a personal computer. Particular embodiments of the invention illustrate printers 110 and 112 as laser printers. However, alternate embodiments of the invention are implemented with ink-jet, bubble-jet or any other type of printer. Furthermore, the teachings of the present invention may be applied to any type of printing device, such as copiers and fax machines. Although not shown in FIG. 1, one or more workstations and/or servers may contain a print rendering engine capable of converting raw print job information into a particular format (e.g., language) understood by certain types of printers.

Figure 2:
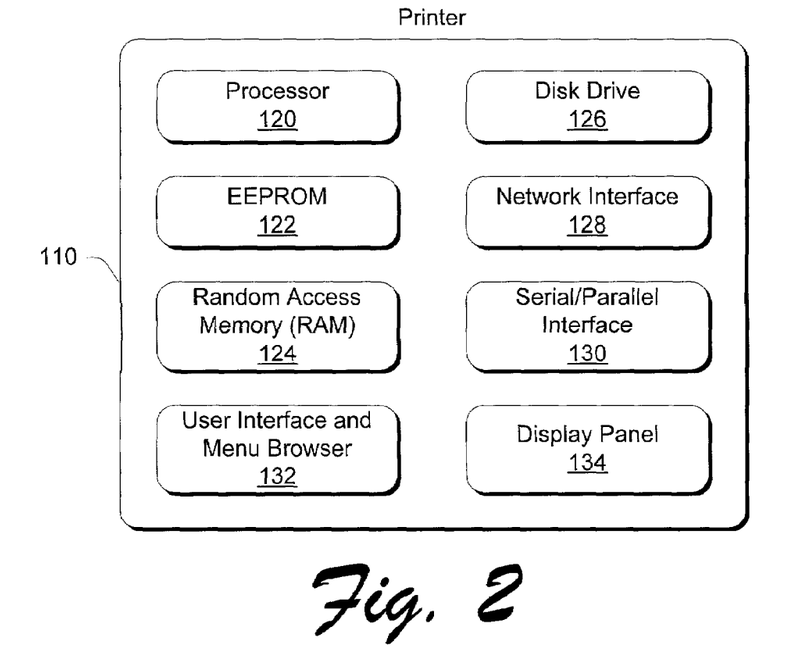
FIG. 2 is a block diagram showing pertinent components of a printer suitable for use with various exemplary systems and/or methods described herein.

FIG. 2 is a block diagram showing pertinent components of printer 110 suitable for use with various examples presented herein. Printer 110 includes a processor 120, an electrically erasable programmable read-only memory (EEPROM) 122, and a random access memory (RAM) 124. Processor 120 processes various instructions necessary to operate the printer 110 and communicate with other devices. EEPROM 122 and RAM 124 store various information such as configuration information, fonts, templates, data being printed, and menu structure information. Although not shown in FIG. 2, a particular printer may also contain a ROM (non-erasable) in place of or in addition to EEPROM 122.

Printer 110 also includes a disk drive 126, a network interface 128, and a serial/parallel interface 130. Disk drive 126 provides additional storage for data being printed or other information used by the printer 110. Although both RAM 124 and disk drive 126 are illustrated in FIG. 2, a particular printer may contain either RAM 124 or disk drive 126, depending on the storage needs of the printer. For example, an inexpensive printer may contain a small amount of RAM 124 and no disk drive 126, thereby reducing the manufacturing cost of the printer. Network interface 128 provides a connection between printer 110 and a data communication network, such as network 100. Network interface 128 allows devices coupled to a common data communication network to send print jobs, menu data, and other information to printer 110 via the network. Similarly, serial/parallel interface 130 provides a data communication path directly between printer 110 and another device, such as a workstation, server, or other computing device. Although the printer 110 shown in FIG. 2 has two interfaces (network interface 128 and serial/parallel interface 130, which are optionally USB or wireless interfaces), a particular printer may only contain one interface.

As shown in FIG. 2, printer 110 also contains a user interface/menu browser 132 and a display panel 134. User interface 132 may be a series of buttons, switches or other indicators that are manipulated by the user of the printer. Display panel 134 is a graphical display that provides information regarding the status of the printer and the current options available through the menu structure. Thus, the user can provide input to the printer 110 by touching the appropriate portion of the touch screen.

Figure 3:
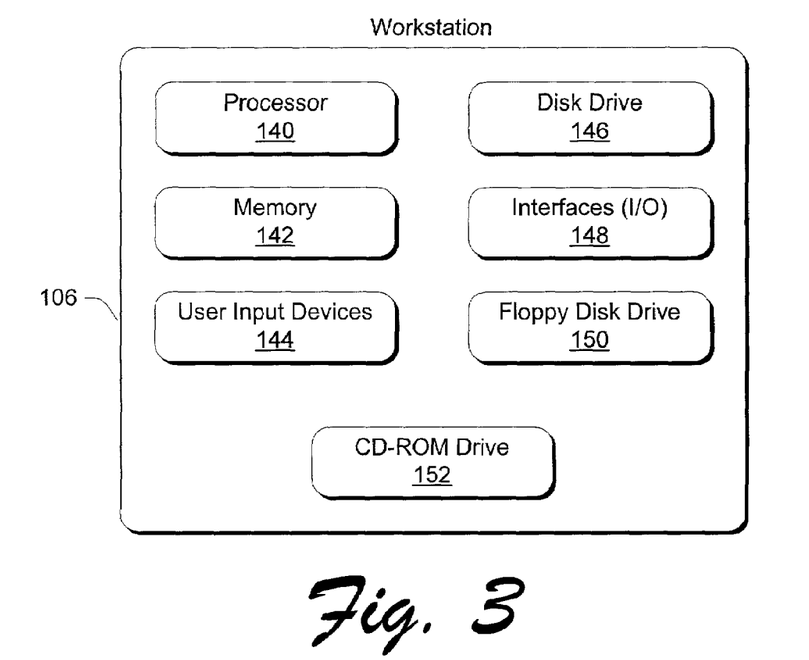
FIG. 3 is a block diagram showing pertinent components of a computer workstation suitable for use with various exemplary systems and/or methods described herein.

FIG. 3 is a block diagram showing pertinent components of a computer workstation 106 in accordance with the description presented herein. Such a workstation may operate as a server; thus, the term workstation includes server and/or client.

Workstation 106 includes a processor 140, a memory 142 (such as ROM and RAM), user input devices 144, a disk drive 146, interfaces 148 for inputting and outputting data, a floppy disk drive 150, and a CD-ROM drive 152. Processor 140 performs various instructions to control the operation of workstation 106. Memory 142, disk drive 146, and floppy disk drive 150, and CD-ROM drive 152 provide data storage mechanisms. User input devices 144 include a keyboard, mouse, pointing device, or other mechanism for inputting information to workstation 106. Interfaces 148 provide a mechanism for workstation 106 to communicate with other devices.

As described below, an exemplary system and/or an exemplary method include and/or use an applet. An applet generally comprises a small, self-contained computer program that performs a task or tasks as part of, or under the control of, a larger software application. For example, most modem World Wide Web browsers are capable of making use of applets written in a JAVA™ programming language (Sun Microsystems, Palo Alto, Calif.) to perform simple tasks such as displaying animations or more complex tasks such as operating spreadsheets and/or databases. However, as described herein, the term "applet" is not limited to applets written in a JAVA™ programming language and/or compiled to JAVA™ programming language bytecode.

An applet typically executes on a virtual machine. As known in the art, a virtual machine is software that acts as an interface between a program code and a processor or hardware platform that actually performs the program's instructions. Examples of commercially available virtual machines include the JAVA™ virtual machine; the .NET™ framework virtual machine (Microsoft Corporation, Redmond, Wash.); and the CHAI® virtual machine (Hewlett-Packard Company, Palo Alto, Calif.). According to the description herein, all of these virtual machines are capable of executing applets. For example, a .NET™ framework virtual machine can execute applets in the form of an intermediate language and a CHAI® virtual machine, which optionally cooperates with a CHAI® server and/or CHAI® services, can execute applets known as chailets. Yet another form of applet is a "servlet", which is code targeted for execution on a server virtual machine rather than a browser virtual machine.

In a traditional client/server model, a server communicates an applet to a client and the client executes the applet. In particular, a client typically uses a browser, having a virtual machine, to download and to execute an applet. To prevent the creation and distribution of malicious code, applet execution usually takes place in a "sandbox". A sandbox can also prevent an applet from reading and/or writing to a client's file system. Of course a wide variety of restrictions and/or permission are possible.

Applet code restricted to a sandbox is generally known as untrusted code whereas code that can have an effect outside of a sandbox is generally known as trusted code. A security procedure related to trust involves the use of a signed applet, for example, an applet accompanied by a digital signature. A signed applet can have an effect outside of a sandbox if the browser recognizes the applet's signature. Once a browser recognizes a signed applet, code associated with the signature will typically be trusted. As described below, an applet's trusted code can have an effect outside of a sandbox, for example, trusted code may cause a search for, or of, files on a workstation, network, storage device, etc. Thus, a trusted applet can cause a client computer to read and/or write to a file, communicate with a device, connect to a socket, and so on.

As described in more detail below, exemplary systems and/or exemplary methods optionally configure a server through use of a set-up information or definition (INF) file. An INF file is typically a text file that contains information about a device(s) and/or file(s) to be installed on a client, a server, a workstation and/or other processor-based device. Usually, a vendor supplies an INF file that installs vendor files related to a vendor's device. For example, a printer vendor may supply an INF file that installs the vendor's printer drivers and/or other files related to the vendor's device. The vendor's INF file may also invoke an INF file of another vendor, such as an operating system vendor. For example, a printer vendor's INF file may invoke an operating system INF file (e.g., ntprint.inf), which in turn installs appropriate printer driver components related to the operating system.

When an installation process begins, a set-up program typically: (i) accesses the INF file's contents, for example, by calling a function that return a handle to the INF file; (ii) verifies the validity of the INF file; and (iii) determines where installation files are located. The set-up program then usually locates an INF manufacturer section, which contains directives to INF models sections, which in turn provide directives leading to various INF "DDInstall" sections, based on the hardware ID of the device being installed. By using system-defined extensions to INF file sections and directives, a single INF file may provide for cross-platform installations and/or for dual-operating system installations.

Figure 4:
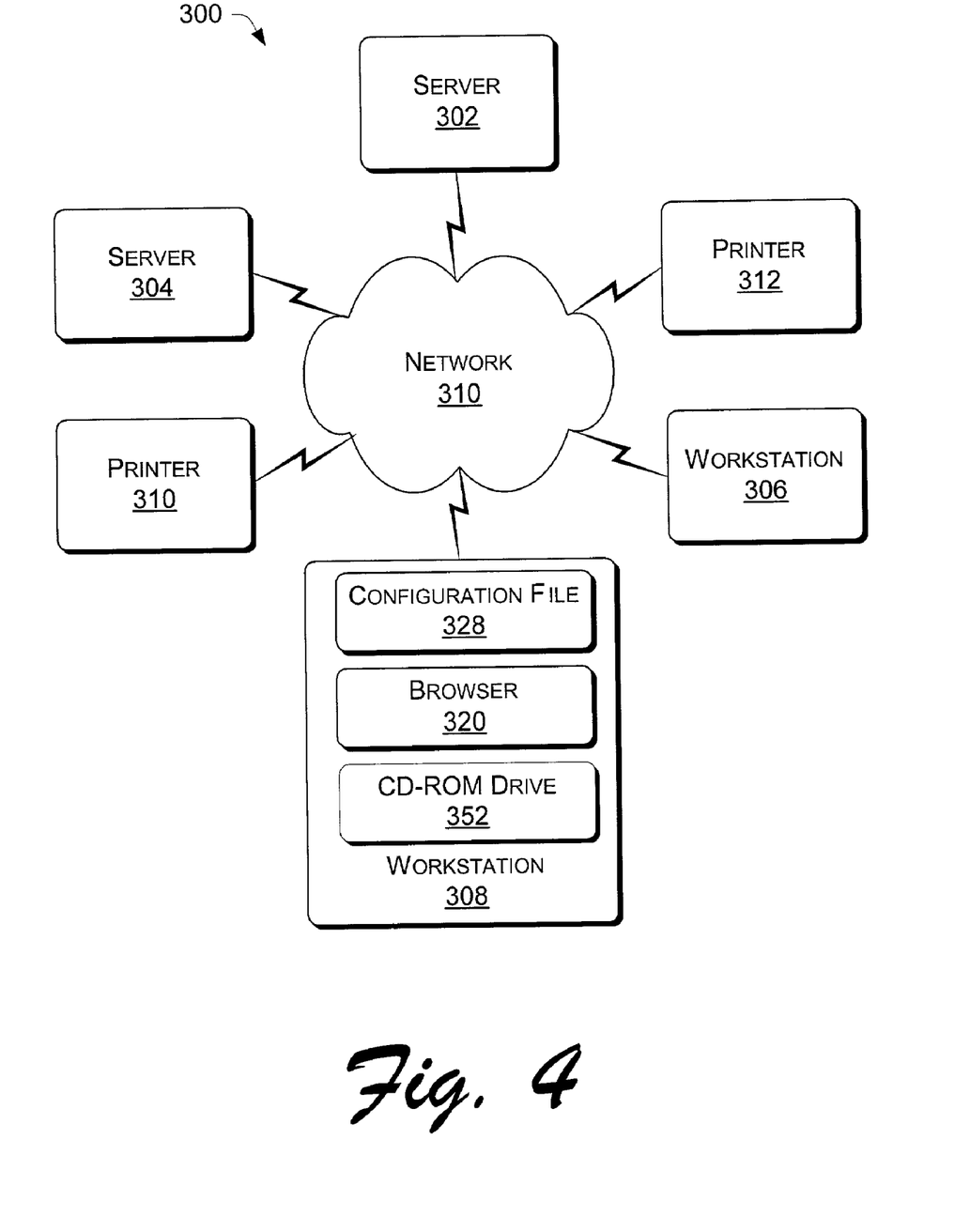
FIG. 4 is a block diagram showing an exemplary system suitable for use with various methods described herein.

Referring to FIG. 4, an exemplary system 300 includes a network 310, workstations 306, 308, servers 302, 304 and peripheral devices, such as, but not limited to printers 310, 312. Workstation 308 further includes a browser 320 (e.g., a Web browser), a configuration file 328, and a CD-ROM drive 352. Note that the configuration file 328 optionally resides on a CD in the CD-ROM drive 352 or on another storage device, such as, a disk drive (e.g., disk drive 146 of FIG. 3), memory (e.g., memory 142 of FIG. 3), or a floppy disk drive (e.g., floppy disk drive 150 of FIG. 3). In addition, any one of the aforementioned storage devices, and equivalents thereof, may substitute for the CD-ROM drive 352.

The browser 320 optionally connects to a server 302, 304 through the network 310 and displays information received from the server 302, 304. For example, when connected to the Web, the browser 320 may act as a Web browser and display a Web page. The configuration file 328 includes information for configuring a server and optionally comprises an INF file. As described below, the configuration file 328 also includes information germane to file retrieval from or through the workstation 308.

Figure 5:
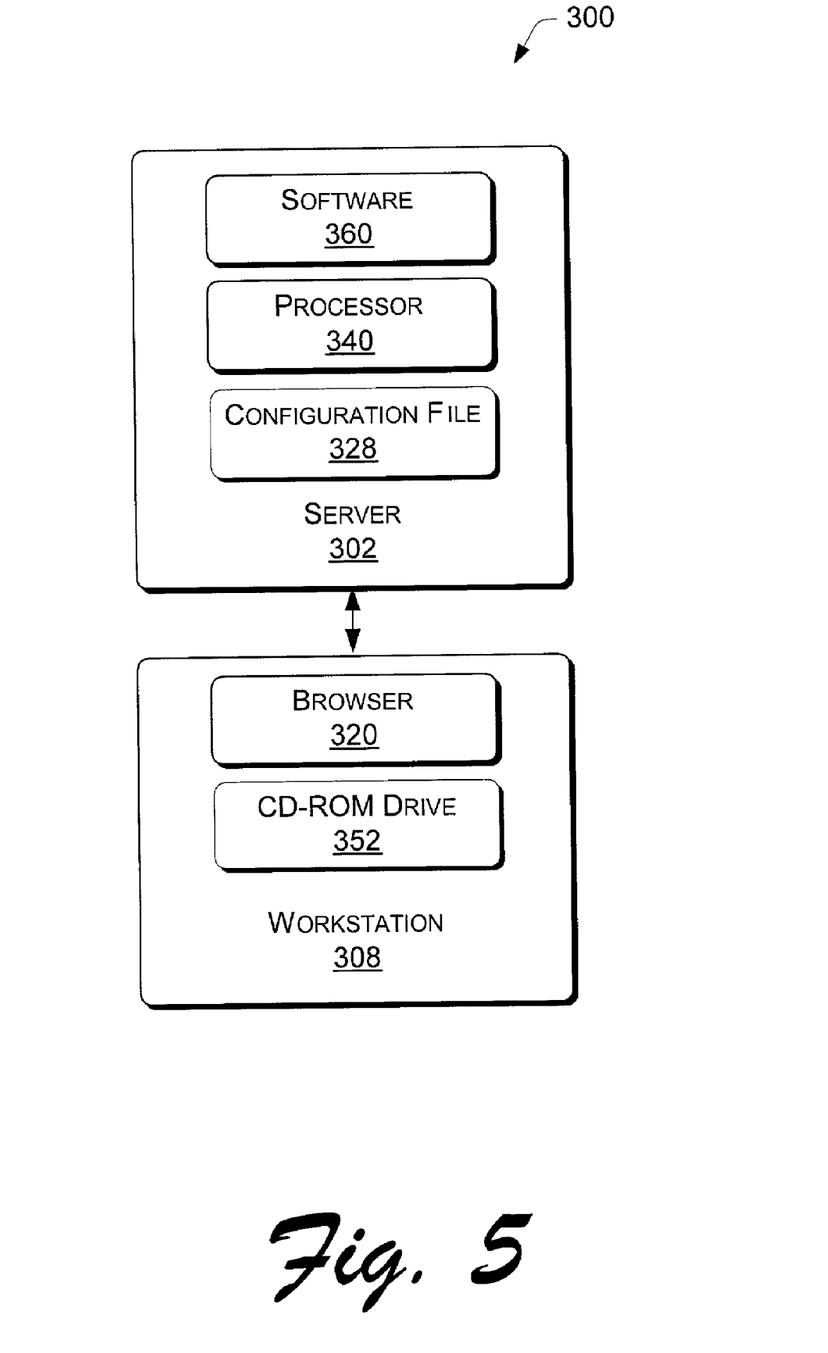
FIG. 5 is a block diagram of the exemplary system shown in FIG. 4, suitable for use with various methods described herein.

FIG. 5 illustrates the server 302 and the workstation 308 of FIG. 4 in relation to an exemplary method. In this exemplary method, the workstation 308 communicates (e.g., via a network or otherwise) with the server 302 to transfer or copy the configuration file 328 to the server 302. Accordingly, in FIG. 5, the configuration file 328 appears as a component of the server 302. Also note that the server 302 includes a processor 340 and software 360. Of course, the server 302 optionally includes other components such as those of the workstation shown in FIG. 3.

Figure 6:
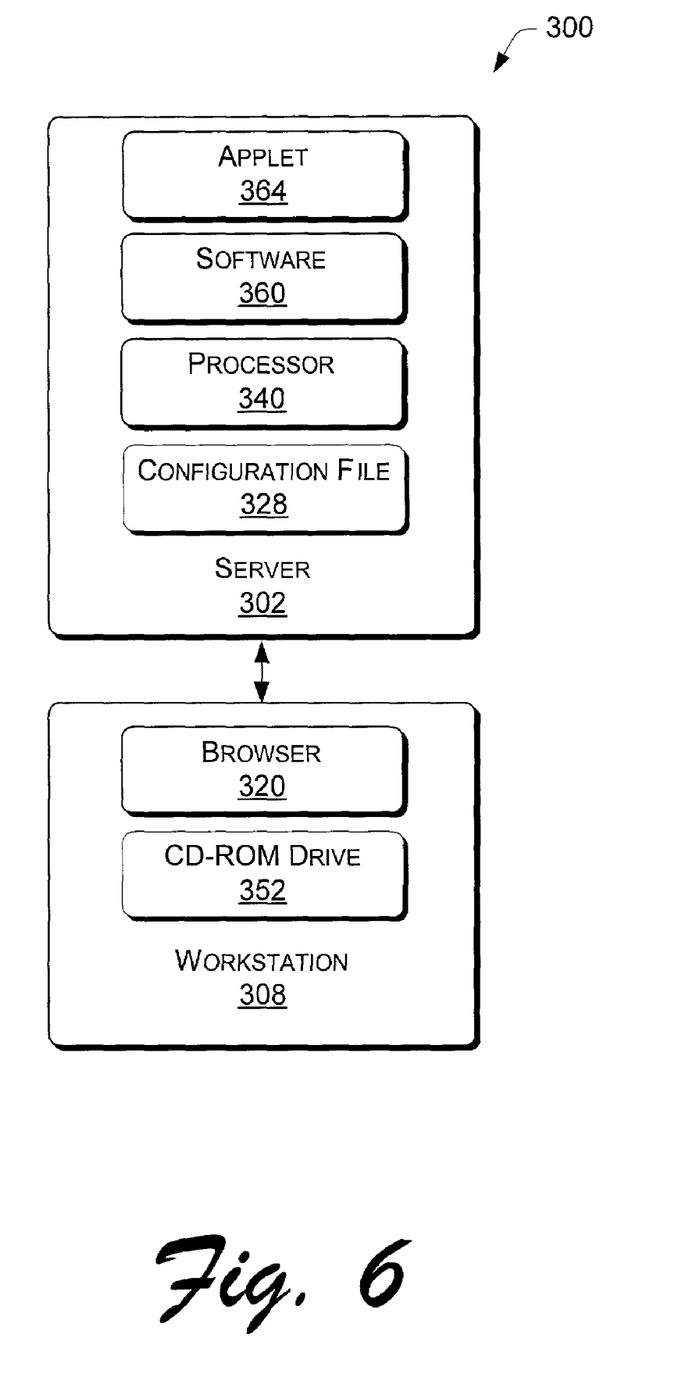
FIG. 6 is a block diagram of the exemplary system shown in FIG. 5, wherein the server includes an applet.

FIG. 6 shows the server 302 and the workstation 308 of FIG. 5 further in relation to an exemplary method. In this exemplary method, the server 302 generates an applet 364 using the processor 340, the software 360 and information contained in the configuration file 328. This applet 364 preferably comprises a form suitable for communication to the workstation 308 and for execution on the browser 320.

Figure 7:
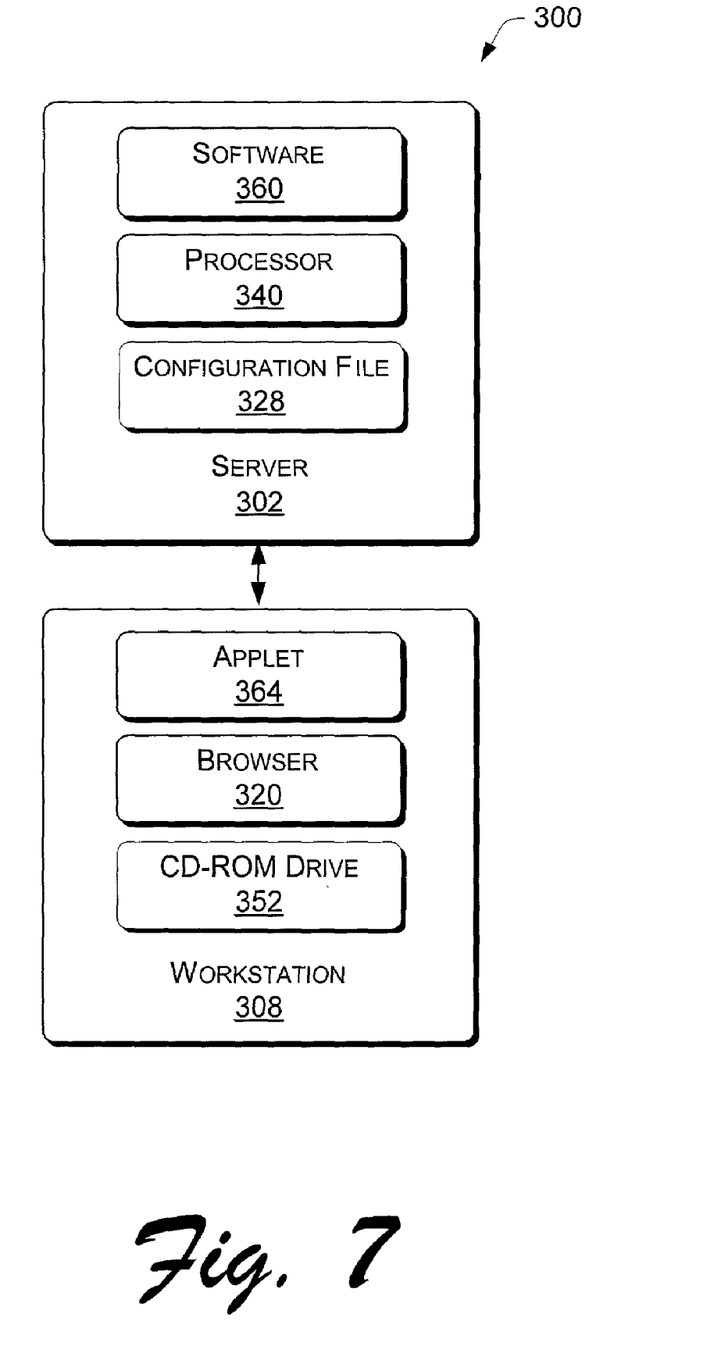
FIG. 7 is a block diagram of the exemplary system shown in FIG. 5, wherein the workstation includes an applet.

FIG. 7 shows the server 302 and the workstation 308 of FIG. 6 further in relation to an exemplary method. In this exemplary method, the sever 302 communicates the applet 364 to the workstation 308. Accordingly, in FIG. 7, the applet 364 appears as a component of the server 308.

Figure 8:
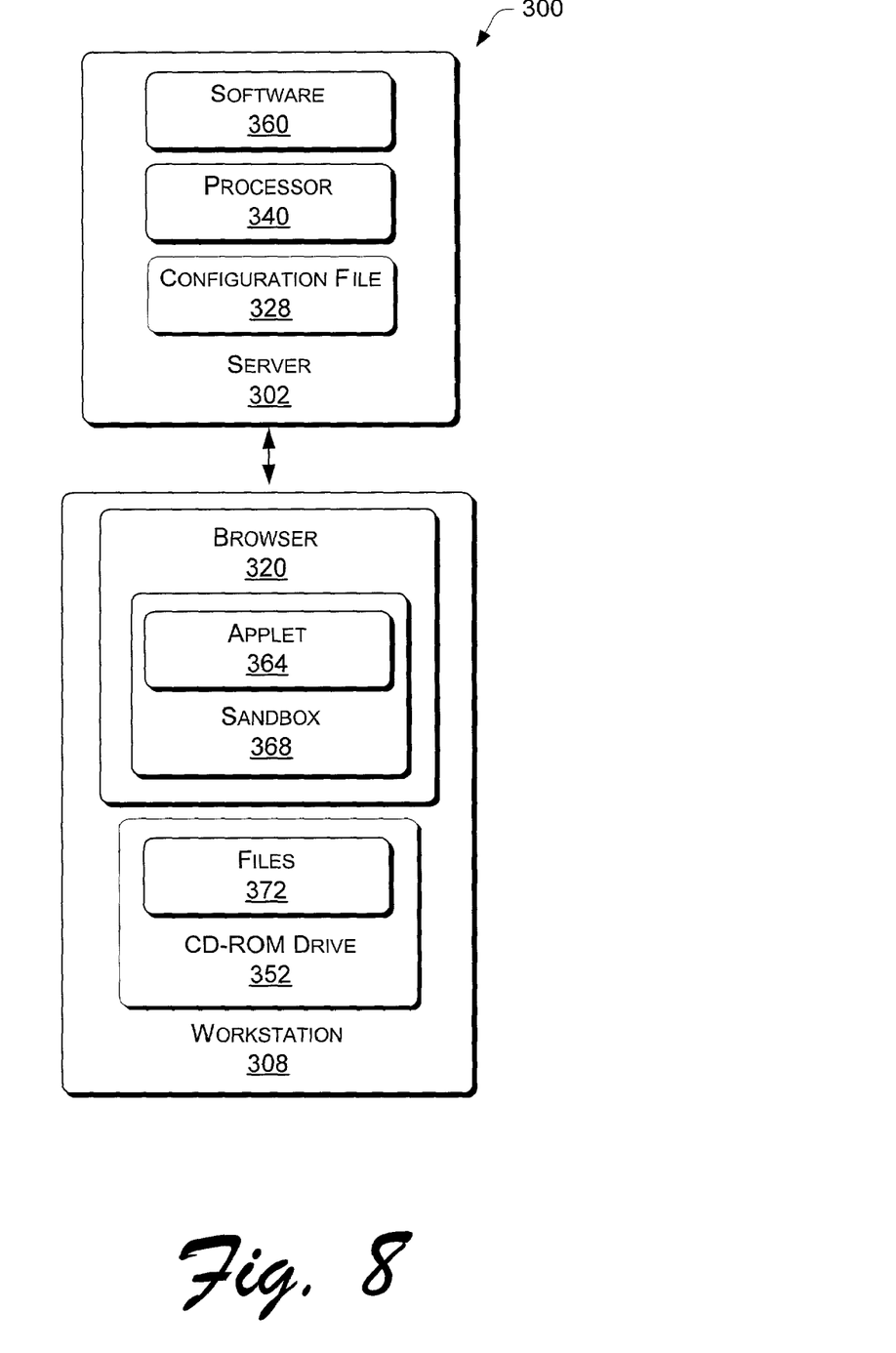
FIG. 8 is a block diagram of the exemplary system shown in FIG. 5, wherein the workstation includes an app let capable of execution in a sandbox.

As mentioned previously, the applet 364 preferably comprises a form suitable for execution on the browser 320. FIG. 8 shows the workstation 308 and the browser 320 further in relation to an exemplary method. In this exemplary method, the browser 320 executes the applet 364 in a sandbox 368. Note that the CD-ROM drive 352 also includes files 372, which are germane to configuration of the server 302. Often, browser security prevents an applet from having effect outside of a sandbox; however, in the exemplary method described, and system 300 shown in FIGS. 4–8, a need exists for the applet 364 to have an effect outside of the sandbox 368. In particular, the applet 364 includes information germane to files needed to configure the server 302. Such information optionally includes file names and/or an interface that allows a user to direct the browser 320 and/or workstation 308 to the needed files.

As shown in FIG. 8, files 372, including files needed for configuration of the server 302, reside on a CD-ROM drive 352. Thus, in the exemplary method, the browser 320 allows the applet to have an effect outside of the sandbox 368. For example, the applet 364 optionally includes a list of file names (or extensions) for files needed to configure the server. In this example, the browser 320 allows for a search of the CD-ROM drive 352 files 372 for the needed files. If this search does not produce adequate results, then the browser 320 may allow for a search of another storage device. Alternatively, the browser 320 may turn control over to a user, e.g., prompting the user to insert a storage medium, browse directories, the Web, other locations, media, and/or devices for the needed files.

Wherein the applet 364 comprises a JAVA™ language applet and the sandbox 368 comprises a JAVA™ language sandbox, the applet is "trusted" and/or contains information to allow for an effect outside of the sandbox 368.

Figure 9:
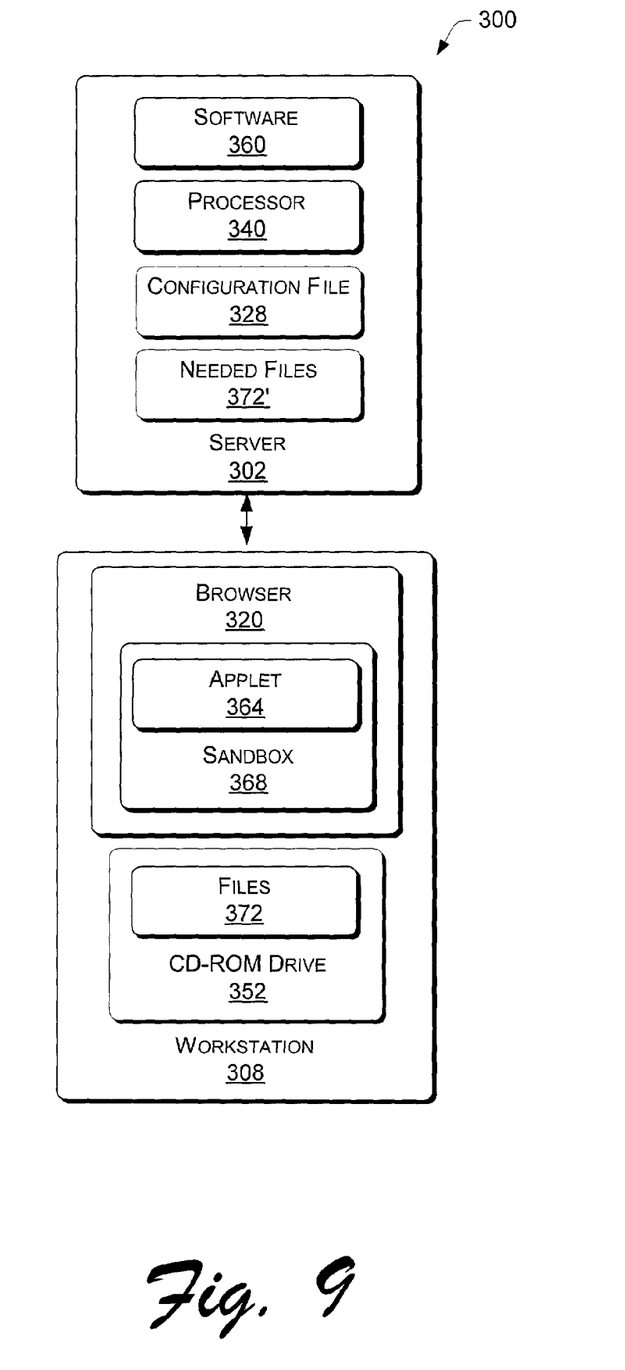
FIG. 9 is a block diagram of the exemplary system shown in FIG. 5, wherein the workstation has communicated needed files to the server.

Referring to FIG. 9, the workstation 308 and the browser 320 are shown in relation to an exemplary method. In particular, the server 302 now includes needed files 372' which were communicated from the workstation 308.

For the exemplary system 300 and/or exemplary methods described above, the configuration file 328 optionally comprises an INF file for configuring a server, and in particular, a printer server.

Figure 10:
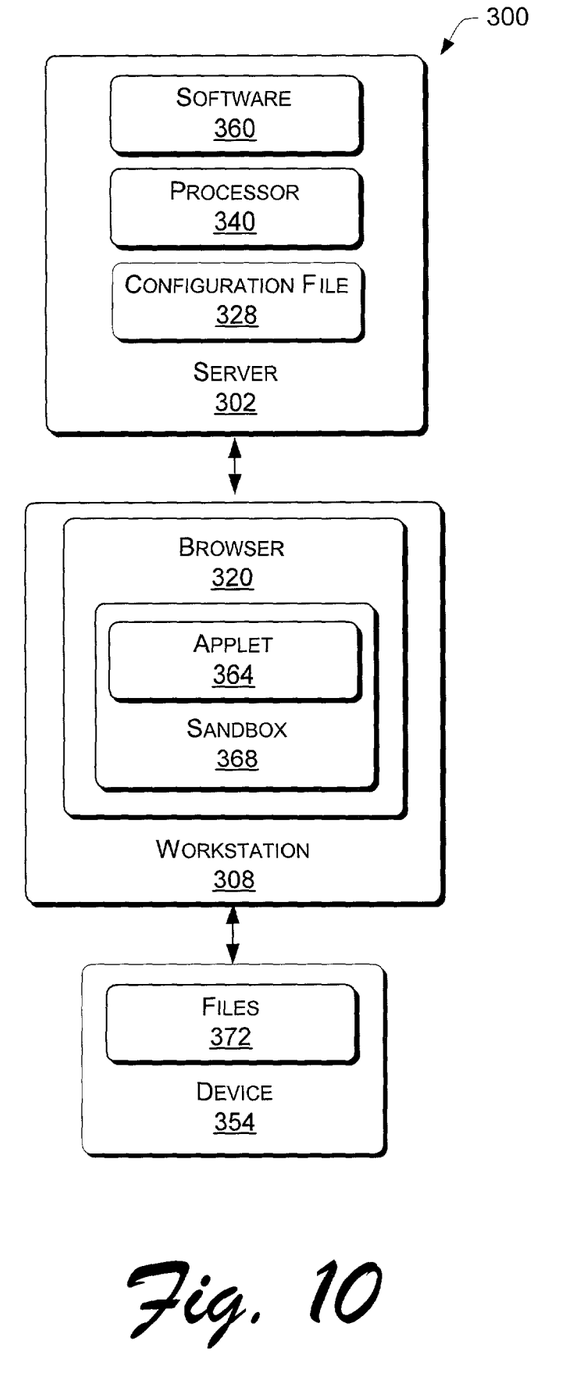
FIG. 10 is a block diagram of an exemplary system including a device in communication with the workstation.

FIG. 10 shows the system 300 wherein the workstation 308 communicates with a device 354 having files 372. In this particular example, the device 354 optionally comprises a photographic and/or videographic instrument (e.g., a still and/or video camera) and/or a medium reader. Most instruments or cameras include memory such as built-in memory and/or removable memory. Often, a user connects a camera to a workstation to communicate files from the camera memory to the workstation memory. Alternatively, a camera uses a memory card, disk, stick, and/or other medium to store image files, which are subsequently available to a workstation equipped with an appropriate medium reader.

In an exemplary method, the device 354 comprises a digital camera having a plurality of image files stored in a built-in memory. When a user connects the camera 354 to the workstation 308, the workstation 308 receives a configuration file 328 from the camera 354. Alternatively, the configuration file 328 already resides on the workstation 308. In either instance, the workstation 308 communicates the configuration file 328 to the server 302. The configuration file 328 optionally includes names and/or extensions of image files (e.g., included in the files 372) resident on the camera 354 and/or other information germane to files (e.g., included in the files 372) resident on the camera 354. In turn, the server 302 communicates an applet 364 to the workstation 308. The applet 364 executes on the workstation 308 and causes a search for image files, for example, locally on the workstation 308 and/or on the camera 354. Of course, as described earlier, the applet 364 optionally allows for user interaction. If the search finds the files, the workstation 308 communicates them to the server 302. Once at the server 302, the files optionally become associated with a Web site.

In yet another exemplary method, referring loosely to elements appearing in FIG. 10, a device 354 functions as a "workstation" and a workstation 308 functions as a "server". In this exemplary method, the device 354 includes a browser (such as browser 320) capable of executing an applet, for example, wherein the device 354 includes a virtual machine. Accordingly, the device 354 communicates a configuration file to the workstation 308 and the workstation 308 generates an applet and communicates the applet to the device 354. The applet executes on the device 354, automatically and/or through user input, to thereby cause a search for files. If the search finds the files, then they are communicated from the device 354 to the workstation 308.

In general, this exemplary method for loading a file on a workstation includes communicating information from a device having a virtual machine to the workstation; generating an applet based on the information; communicating the applet from the workstation to the device; executing the applet on the device to thereby cause searching for a file; and communicating the file to the workstation. In this exemplary method, the workstation optionally comprises a server and/or the device optionally comprises a workstation.

Figure 11:
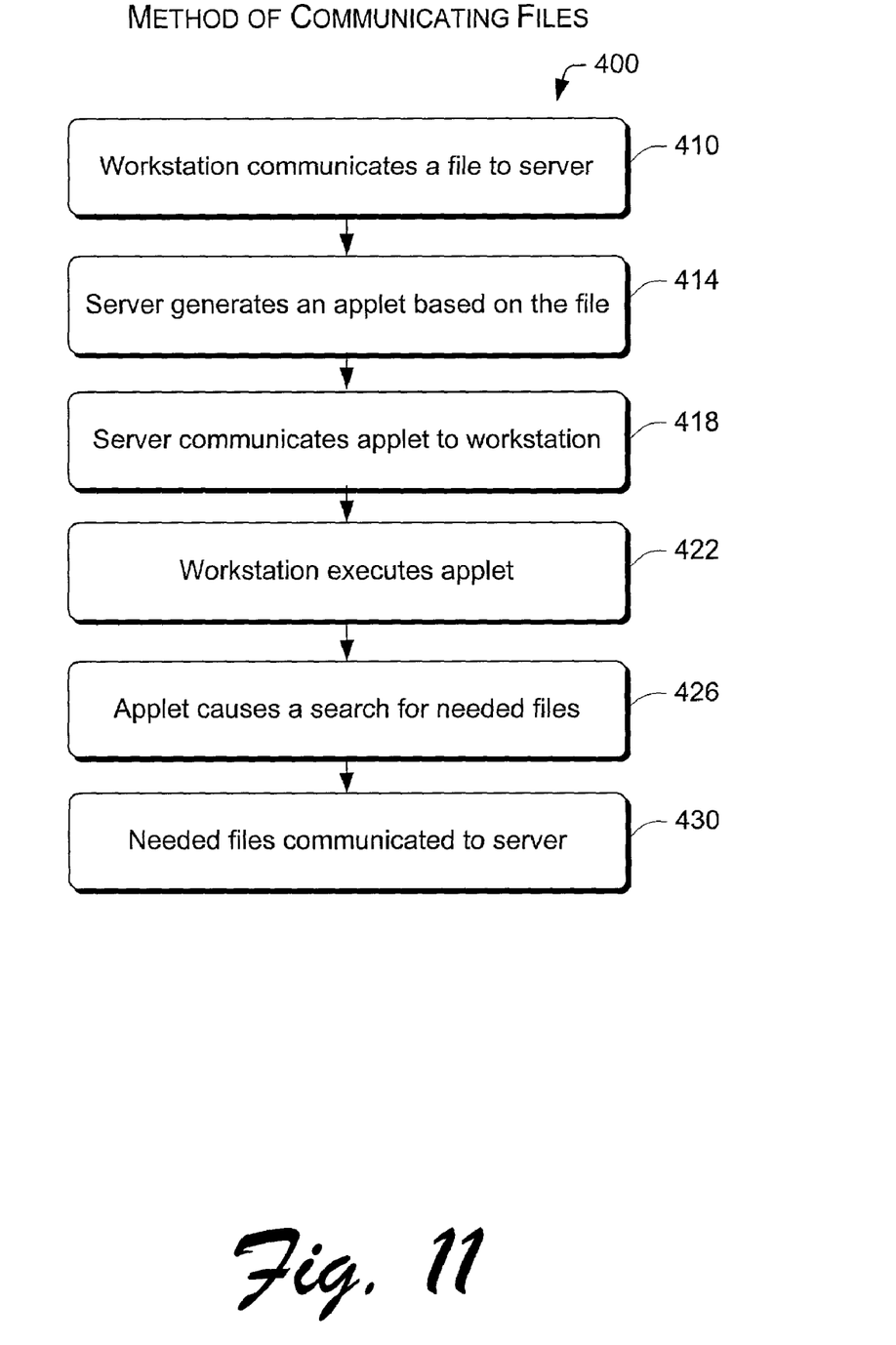
FIG. 11 is a block diagram of an exemplary method that communicates files.

FIG. 11 illustrates a block diagram of an exemplary method of applet assisted loading 400 to communicate files from and/or through a workstation to a server. This exemplary method optionally executes on the system 300 shown in FIGS. 4–9. In a communication block 410, a workstation communicates a file to a server. In an applet generation block 414, the server generates an applet based on or related to information contained in the file. In another communication block 418, the server communicates the applet to the workstation. The workstation, through an execution block 422, executes the applet. A search block 426 follows, wherein applet execution causes a search for needed files. If the search finds a file or files, then a third communication block 430 communicates the file or files to the server.

In the exemplary method described above with reference to FIG. 11, the file in communication block 410 optionally comprises an INF file for configuring a server, and in particular, a printer server. In yet another exemplary method, the workstation communicates information that is not necessarily in the form of a file and the server generates an applet based on the communicated information. For example, the information may optionally comprise a notification in response to a communication channel being established. In this exemplary method, the notification triggers generation and/or communication of an applet to the workstation. Thus, in some instances, the server does not need to generate an applet but only communicate an existing applet to the workstation in response to a notification.

CONCLUSION

The systems and/or methods disclosed herein are suitable for a variety of applications. Such applications include, but are not limited to: E-commerce solutions that integrate imaging and printing with enterprise/service provider business processes; hardcopy solutions that integrate imaging and printing processes and provide building blocks for E-commerce solutions (e.g., E-Publishing, consumables/usage management (including sensors), peripheral management, overall system/data/job/network management/flow/security, document/job management, media/finishing management, media finishing hardware, color management, connectivity solutions, user interfaces, Casper); Internet centric architecture (e.g., performance, imaging and printing (I&P) solution infrastructure, I&P spoolers, virtual personal printer, digital send "like" technologies, JetSend "like" technologies, wireless, other new forms of connectivity, home networking); and service and support (e.g., remote diagnostics (including sensors), predictive maintenance, consumables management, call center enhancements).

Although the invention has been described in language specific to structural features and/or methodological steps, it is to be understood that the invention defined in the appended claims is not necessarily limited to the specific features or steps described. Rather, the specific features and blocks are disclosed as preferred forms of implementing the claimed invention.

The invention claimed is:

1. A method comprising:
   communicating a file from a client to a server, the file containing information;
   generating an applet based on the information;
   communicating the applet from the server to the client;
   executing the applet on the client to thereby cause searching for an additional file; and
   communicating the additional file to the server, wherein the file comprises an INF file.

2. The method of claim 1 wherein the INF file comprises a printer INF file.

3. The method of claim 1 wherein the server comprises a printer server.

4. The method of claim 1 wherein the applet comprises a security signature.

5. The method of claim 1 wherein the information comprises file names.

6. The method of claim 1 wherein the information comprises a file name associated with the additional file.

7. The method of claim 1 wherein the executing includes searching a CD in a CD-ROM drive.

8. The method of claim 1 wherein the executing includes searching a memory associated with a camera.

9. The method of claim 1 wherein the executing includes searching for an image file.

10. The method of claim 1 wherein the executing includes invoking a request for a user's input.

11. A computer-readable medium containing a computer program that is storable in memory and executable by a processor to configure a server to generate the applet of the method of claim 1.

12. A method for configuring a server comprising:
    communicating a file from a client to the server, the file containing information;
    generating an applet based on the information;
    communicating the applet from the server to the client;
    executing the applet on the client to thereby cause searching for an additional file, wherein executing includes searching a CD in a CD-ROM drive;
    communicating the additional file to the server; and
    configuring the server using at least the additional file.

13. The method of claim 12 wherein the file comprises an INF file.

14. The method of claim 13 wherein the INF file comprises a printer INF file.

15. The method of claim 12 wherein the server comprises a printer server.

16. The method of claim 12 wherein the applet comprises a security signature.

17. The method of claim 12 wherein the information comprises file names.

18. The method of claim 12 wherein the information comprises a file name associated with the additional file.

19. The method of claim 12 wherein the executing includes searching a CD in a CD-ROM drive.

20. A method for configuring an Internet Web server comprising:
    communicating a file from a printer to the Web server, the file containing information;
    generating an applet based on the information;
    communicating the applet from the Web server to the printer;
    executing the applet on the printer to thereby cause searching by the printer for an additional file;
    communicating the additional file to the Web server; and
    configuring the Web server using at least the additional file.

21. The method of claim 20 wherein the additional file comprises an image file.

22. The method of claim 20 wherein the configuring comprises associating the additional file with a Web page.

23. The method of claim 20 wherein the additional file comprises an image file associated with a Web page hosted by the Web server.

24. A method comprising:
    communicating a file from a printer to a server, the file containing information;
    generating an applet based on the information;
    communicating the applet from the server to the printer;
    executing the applet on the printer to thereby cause searching by the printer for an additional file;
    communicating the additional file to the server; and
    configuring the server using at least the additional file.

* * * * *